US010488832B2

(12) United States Patent
Sayyarrodsari et al.

(10) Patent No.: US 10,488,832 B2
(45) Date of Patent: *Nov. 26, 2019

(54) PREDICTIVE MONITORING AND DIAGNOSTICS SYSTEMS AND METHODS

(71) Applicant: ROCKWELL AUTOMATION TECHNOLOGIES, INC., Mayfield Heights, OH (US)

(72) Inventors: Bijan Sayyarrodsari, Austin, TX (US); Kadir Liano, Pflugerville, TX (US); Alexander Barton Smith, Round Rock, TX (US); Apurva Prakash Samudra, Mountain View, CA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/123,678

(22) Filed: Sep. 6, 2018

(65) Prior Publication Data
US 2019/0004485 A1 Jan. 3, 2019

Related U.S. Application Data

(63) Continuation of application No. 14/943,621, filed on Nov. 17, 2015, now Pat. No. 10,073,421.

(51) Int. Cl.
*G05B 13/04* (2006.01)
*G05B 23/02* (2006.01)

(52) U.S. Cl.
CPC ......... *G05B 13/048* (2013.01); *G05B 23/024* (2013.01)

(58) Field of Classification Search
CPC .............................. G05B 13/048; G05B 23/024
USPC .......................................................... 700/31
See application file for complete search history.

(56) References Cited

U.S. PATENT DOCUMENTS

| 2008/0004841 A1 | 1/2008 | Nakamura |
| 2008/0089703 A1 | 4/2008 | Calamita |
| 2012/0130695 A1 | 5/2012 | Tsourapas et al. |

OTHER PUBLICATIONS

Dai Xuewu et al: "From Model, Signal to Knowledge: A Data-Driven Perspective of Fault Detection and Diagnosis", IEEE Transactions on Industrial Informatics, IEEE Service Center, New York, NY, US, vol. 9, No. 4, Nov. 1, 2013 (Nov. 1, 2013), pp. 2226-2238.

(Continued)

*Primary Examiner* — Robert E Fennema
*Assistant Examiner* — Jigneshkumar C Patel
(74) *Attorney, Agent, or Firm* — Fletcher Yoder, P.C.

(57) ABSTRACT

System and method for improving operation of an industrial automation system, which includes a control system that controls operation of an industrial automation process. The control system includes a feature extraction block that determines extracted features by transforming process data determined during operation of an industrial automation process based at least in part on feature extraction parameters; a feature selection block that determines selected features by selecting a subset of the extracted features based at least in part on feature selection parameters, in which the selected features are expected to be representative of the operation of the industrial automation process; and a clustering block that determines a first expected operational state of the industrial automation system by mapping the selected features into a feature space based at least in part on feature selection parameters.

16 Claims, 10 Drawing Sheets

(56) References Cited

OTHER PUBLICATIONS

Du R et al: "Automated Monitoring of Manufacturing Processes, Part 1: Monitoring Methods" Transactions of the American Society of Mechanical Engineers, Series B: Journal of Engineering for Industry, ASME. New York, US, vol. 117, No. 2, May 1, 1995 (May 1, 1995), pp. 121-132.
Worden K et al: "Natural Computing for Mechanical Systems Research: A tutorial overview", Mechanical Systems and Signal Processing, Elsevier, Amsterdam, NL, vol. 25, No. 1, Jan. 1, 2011 (Jan. 1, 2011), pp. 4-111.
Extended EP Search Report for EP Application No. 16199319.1 dated Mar. 17, 2017; 10 Pages.

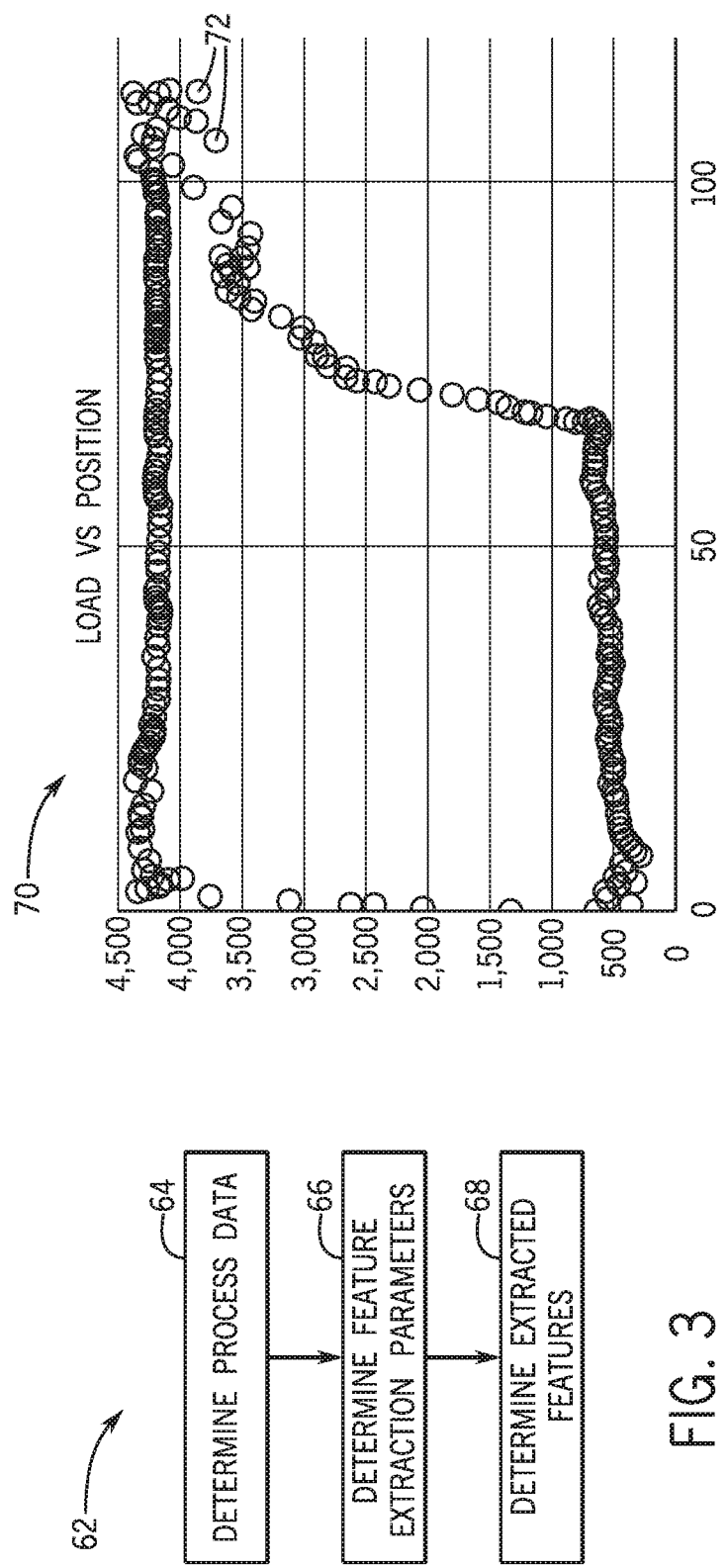

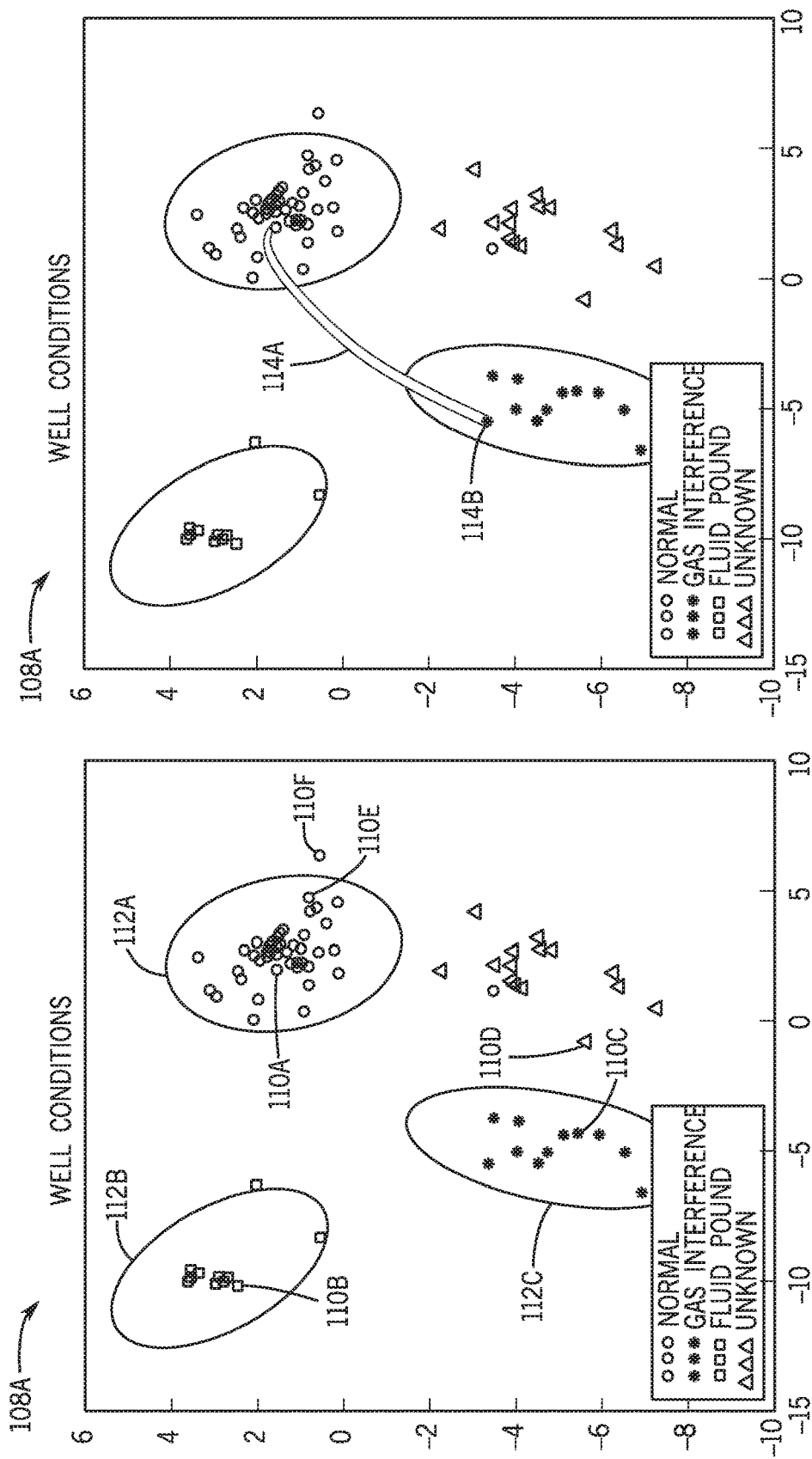

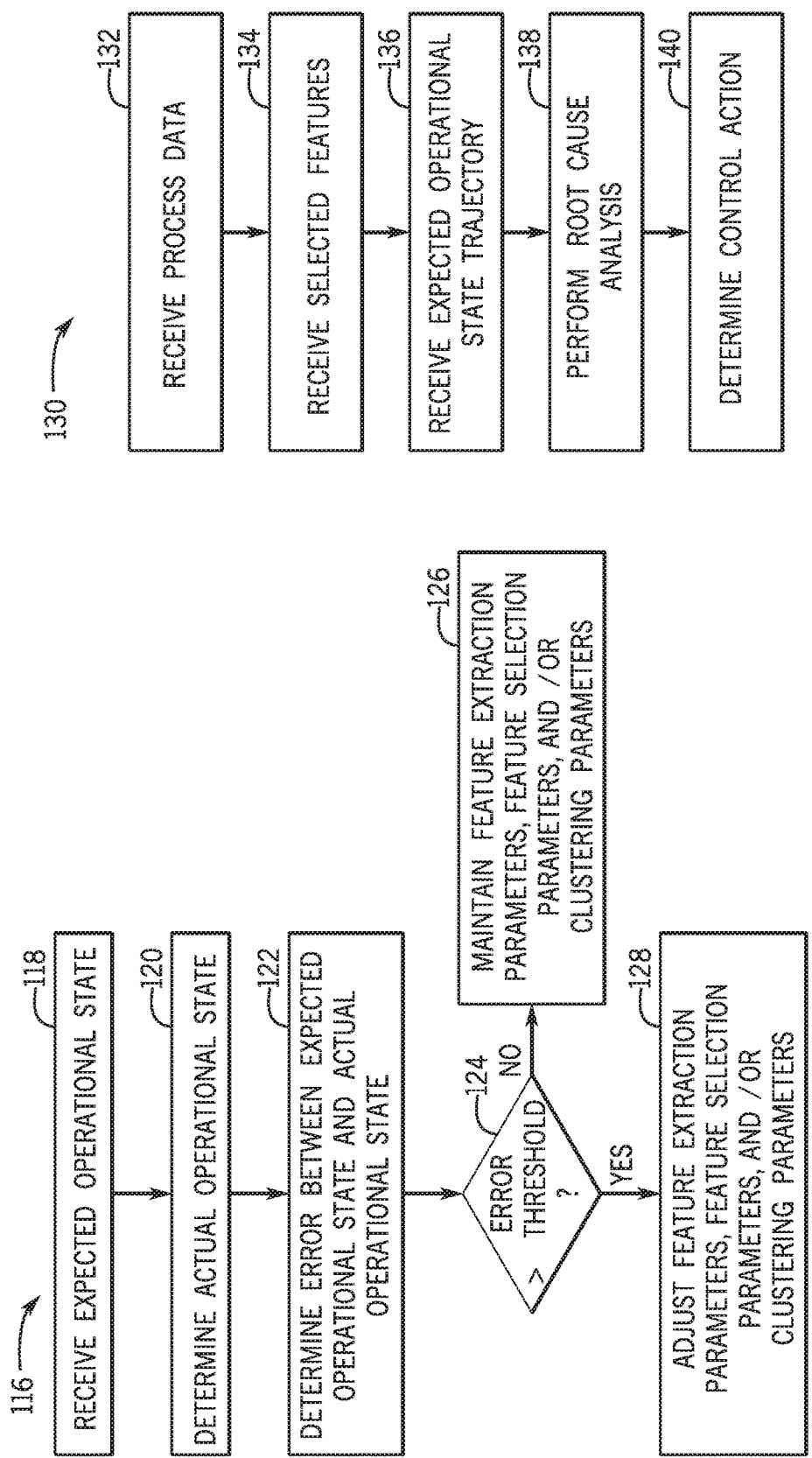

PREDICTIVE MONITORING AND DIAGNOSTICS SYSTEMS AND METHODS

CROSS REFERENCE TO RELATED APPLICATION

This application is a continuation of and claims priority to U.S. application Ser. No. 14/943,621 entitled "PREDICTIVE MONITORING AND DIAGNOSTICS SYSTEMS AND METHODS," filed Nov. 17, 2015, which is herein incorporated by reference in its entirety.

BACKGROUND

The present disclosure generally relates to control systems and, more particularly, to using control system for monitoring, diagnostics, and/or modeling generation.

Generally, a control system may facilitate performance of an industrial automation process by controlling operation of one or more automation devices. For example, to facilitate performing an industrial automation process, the control system may determine a control action and instruct an automation device (e.g., a rod-pump) to perform the control action. Additionally, the control system may facilitate monitoring performance of the process to determine whether the process is operating as desired. When not operating as desired, the control system may also facilitate performing diagnostics on the process to determine cause of undesired operation.

However, as complexity (e.g., number of automation devices and/or amount of process data) of a process increases, complexity of monitoring and/or diagnostics may also increase. For example, increasing amount of process data determined from the industrial automation system may increase number of factors to consider when determining whether the process is operating as desired and/or the cause of undesired operation. In other words, monitoring and/or diagnostics for a complex process may be dependent on ability to efficiency process large amounts of data, particularly when performed in real-time or near real-time (e.g., online during operation of the process).

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

A first embodiment provides an industrial automation system, which includes a control system that controls operation of an industrial automation process. The control system includes a feature extraction block that determines extracted features by transforming process data determined during operation of an industrial automation process based at least in part on feature extraction parameters; a feature selection block that determines selected features by selecting a subset of the extracted features based at least in part on feature selection parameters, in which the selected features are expected to be representative of the operation of the industrial automation process; and a clustering block that determines a first expected operational state of the industrial automation system by mapping the selected features into a feature space based at least in part on feature selection parameters.

A second embodiment provides a method of operating an industrial automation process that includes receiving, using a control system communicatively coupled to the industrial automation process, process data determined during operation of the industrial automation process from a process data source; transforming, using the control system, the process data based at least in part on feature extraction parameters to determine extracted features, in which transforming the process data includes transforming the process data from a time domain to a frequency domain, transforming the process data to a principle component domain, or both; selecting, using the control system, a subset of the extracted features based at least in part on feature selection parameters to determine selected features, in which the selected features are expected to be indicative of operation of the industrial automation process and include fewer dimensions than the process data; and controlling, using the control system, operation of the industrial automation process based at least in part on the selected features.

A third embodiment provides a tangible, non-transitory, computer-readable medium that store instructions executable by a processor in an industrial automation system. The instructions include instructions to determine, using the processor, a first expected value of an operational parameter of an industrial automation process performed in the industrial automation system during operation of the industrial automation process at a first time step, in which the operational parameter comprises an operational state of the industrial automation process, a target variable of the industrial automation process, or both; determine, using the processor, an error between the first expected value and an actual value of the operational parameter; adjust, using the processor, parameters used to determine the first expected value of the operational parameter based at least in part on the error; determine, using the processor, a second expected value of the operational parameter during operation of the industrial automation process at a second time step after the parameters are adjusted; and instruct, using the processor, one or more industrial automation devices in the industrial automation system to implement a control action determined based at least in part on the second expected value of the operational parameter. The instruction to the parameters include instructions to adjust feature extraction parameters used to extract features from process data during operation of the industrial automation process; and adjust feature selection parameters used to select a subset of the features extracted from the process data, in which the subset of the features is indicative of operation of the industrial automation process and comprise fewer dimensions than the process data.

DRAWINGS

These and other features, aspects, and advantages of the present invention will become better understood when the following detailed description is read with reference to the accompanying drawings in which like characters represent like parts throughout the drawings, wherein:

FIG. 3 is a flow diagram of a process for operating a feature extraction block of the monitoring and diagnostic system of FIG. 2, in accordance with an embodiment;

FIG. 4 is a plot of example process data used by the feature extraction block of FIG. 3, in accordance with an embodiment;

FIG. 8A is a plot of expected operational parameters determined by the clustering block, in accordance with an embodiment;

FIG. 8B is a plot of expected operational parameter trajectory determined by the clustering block, in accordance with an embodiment;

FIG. 9 is a flow diagram of a process for operating a validation block of the monitoring and diagnostic system of FIG. 2, in accordance with an embodiment;

FIG. 10 is a flow diagram of a process for operating a diagnostic block of the monitoring and diagnostic system of FIG. 2, in accordance with an embodiment;

DETAILED DESCRIPTION

Figure 1:
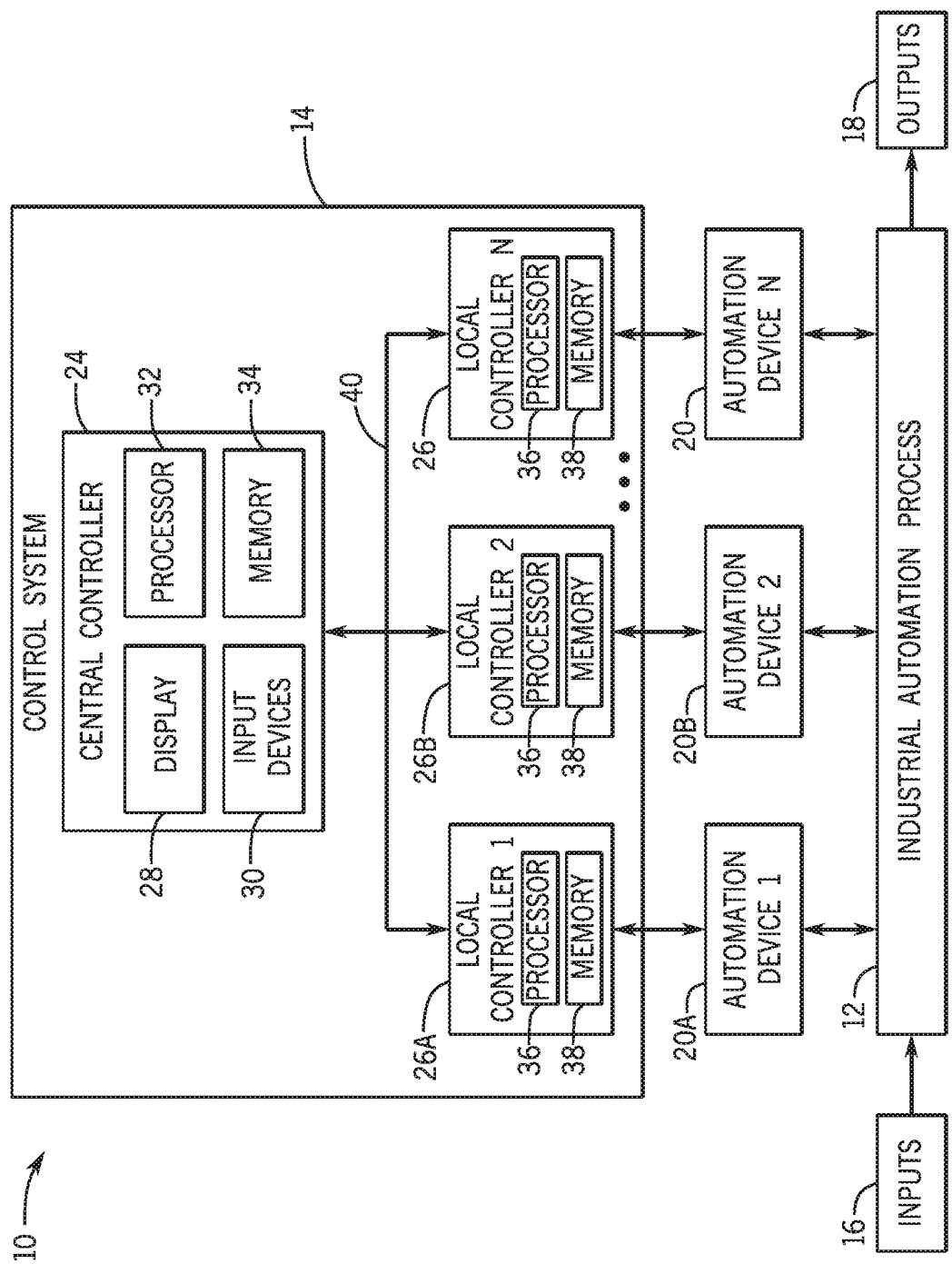
FIG. 1 is a block diagram of a control system used to control operation of a process, in accordance with an embodiment.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed above, a control system may control operation of one or more automation devices to facilitate performing an industrial automation process. Industrial automation processes may be used in various contexts, such as a manufacturing plant, a resource extraction system, an industrial plant, a power generation system, or the like. For example, in a resource extraction system context, a control system may control load and position of a rod pump (e.g., an automation device) to perform an oil extraction process. Although examples are provided with regard to specific contexts, one of ordinary skill in the art will recognize that these examples are not intended to be limiting and that the techniques described herein can be used with any suitable context.

To improve operation, the control system may monitor performance of the one or more automation devices and/or the industrial automation process as a whole. For example, the control system may determine whether operation is as desired by analyzing process data. As used herein, "process data" is intended to describe data indicative of operation of an industrial automation process. For example, the process data may include inputs to the industrial automation process, outputs from the industrial automation process, disturbance variables (e.g., environmental conditions), constraints on operation, operational parameters (e.g., temperature, speed, load, position, voltage, and/or pressure) of an automation device, and the like.

Additionally, the control system may perform diagnostics to facilitate identifying cause of undesired operation and remedying the undesired operation. For example, the control system may analyze the process data to determine a likely cause of undesired operation and possible steps to remedy the likely cause. As such, the control system may analyze the process data to facilitate performance monitoring and/or diagnostics.

When monitoring performance and/or performance diagnostics in real-time or near-real time (e.g., online during operation of the industrial automation process), the control system may be limited on duration allocated to analyze the process data. Moreover, the amount of process data analyzed to monitor performance and/or perform diagnostics generally increases with complexity of the industrial automation process. For example, since process data may include operation parameters of automation devices, the amount of process data may increase as number of automation devices used in the industrial automation process increases. Additionally, since process may data may include environmental conditions, the amount of process data may increase as distribution size of automation devices used in the industrial automation process increases.

Accordingly, as will be described in more detail below, the present disclosure provides techniques to improve efficiency of performance monitoring and/or diagnostics, for example, to facilitate performance in real-time or near real-time. In some embodiments, a control system may include a monitoring and diagnostic system to monitor performance and/or determine diagnostics. Using the monitoring and diagnostic system, the control system may analyze received process data to extract features, which are intended be indicative of operation of the industrial automation process. In other words, the features may indicate the process data in a different manner to facilitate analysis. For example, in some embodiments, the control system may extract features by performing a transform (e.g., fast-Fourier-transform) on the process data to convert from a time domain to a frequency domain.

As described above, complex industrial automation processes may include a large amount of process data. Since determined based on the process data, a large number of features may be extracted from large amounts of process data. Thus, analysis of each of the extracted features may still result in complex (e.g., multi-dimensional) analysis.

Accordingly, the control system may select features from the extracted features, which are expected to be sufficient to generally represent operation of the industrial automation process. In other words, the control system may select a portion (e.g., subset) of the extracted features, which may facilitate reducing complexity (e.g., dimensions) of the analysis. In some embodiments, the control system may select features to facilitate determining operational state of the industrial automation process. For example, the control system may select features that are most expected to affect the operational state of the industrial automation process. Additionally, the control system may select features to improve certainty of the expected operational state, for example, to optimize (e.g., increase) distance between defined operational state categories.

The control system may then analyze the selected features to determine an expected operational state of the industrial automation process, for example, using clustering. In some embodiments, the control system may determine a metric based at least in part on value of the selected features and determine the expected operational state based at least in part on value of the metric. For example, in a resource extraction process (e.g., an oil well using a rod-pump), the control system may determine a metric based at least in part on a first selected feature and a second selected feature. Using the metric, the control system may determine that the resource extraction process is expected to be in a normal operational state when the metric is within a metric value region associated with the normal operational state (e.g., the first selected feature falls within a first range associated with the normal operational state and the second selected feature falls within a second range associated with the normal operational state). On the other hand, the control system may determine that the resource extraction process is in a gas interference operational state when the metric is within a metric value region associated with the gas interference operational state (e.g., the first selected feature fall within a second range associated with the gas interference operational state and the second feature falls within a third range associated with the gas interference operational state).

Additionally, in some embodiments, the control system may analyze the selected features to determine expected trajectory of the operational state of the industrial automation process. In other words, the control system may determine an expected current operational state as well as predict how the operational state is expected to change during subsequent operation (e.g., over a control trajectory of subsequent time steps). For example, the control system may determine that the resource extraction process is expected to gradually transition from the normal operational state to the gas interference operational state over the next five hours of operation.

The control system may then validate the determination of the expected operational state, for example, by comparing the expected operational state to an actual operational state of the industrial automation process. In some embodiments, an operator may input the actual operational state control system and the control system may compare the actual operational state with the expected operational state to determine an error. Additionally, in some embodiments, the control system may determine an actual operational state when a future time step is reached and compare the actual operational state with an expected operational state previously predicted for the future time step to determine an error.

Based on the error, the control system may adjust parameters used to extract the features, select the features, and/or determine the expected operational state (e.g., clustering). In some embodiments, the control system may adjust feature extraction parameters to change technique used to extract features from the process data. For example, the control system may switch from using a fast-fourier-transform technique to a principle correction analysis (PCA) technique or a learning machine technique. Additionally, in some embodiments, the control system may adjust feature selection parameters to change selection criteria of features selected from the extracted features. For example, the control system may adjust type and/or number of features selected. Furthermore, in some embodiments, the control system may adjust clustering operational parameters to adjust relationship (e.g., mapping) between selected features and an expected operational state. For example, the control system may adjust metric value area associated with possible operational states.

In some embodiments, the control system may also facilitate diagnostics based at least in part on the process data, the selected features, and/or the expected operational state. For example, the control system may perform a root-cause-analysis (e.g., an optimization problem) based on the process data and/or the selected features to determine an expected cause of the expected operational state. As described above, in some embodiments, the control system may determine a trajectory of the expected operational state over a control horizon. In such embodiments, the control system may improve accuracy of diagnostics by analyzing the expected current operational state as well as expected future operational states and/or expected changes in the operational state.

Based on results of the diagnostics, the control system may automatically determine control actions expected to adjust operational state of the industrial process. In some embodiments, the control actions may be automatically implemented by instructing one or more automation devices to implement the control actions. Additionally or alternatively, the control system may present visual representations of the diagnostic results and/or determined control actions to a user. In this manner, the control system may facilitate performing diagnostics on operation of the industrial automation process.

In addition, the control system may also present visual representations of the process data, the selected features, and/or expected operational state. As described above, operational state of the industrial automation process may be based on a large amount of process data. Although based on a subset, the expected operational state may still be determined based on multiple selected features. Accordingly, to facilitate display, the control system may generate visualizations that simplify presentation, for example, by reducing dimensions.

For example, the control system may determine an expected operational state based on five different selected features. Thus, to fully present the relationship, a five dimensional plot (e.g., visual representation) may be used, which can be difficult to display and understand on a two dimensional display. To improve presentation, the control system may instead generate a two dimensional plot indicating relationship between the expected operational parameter and the two selected features that contribute most to the expected operational parameter. In this manner, the control system may facilitate presenting results of performance monitoring and/or diagnostics.

To help illustrate, one embodiment of an industrial automation system 10 that includes an industrial automation process 12 and a control system 14 is described in FIG. 1. In the depicted embodiment, the industrial automation process 14 may be any conceivable type. For example, the industrial automation process 14 may be a manufacturing process, a steady state process, a batch process, a chemical process, a material handling process, an energy utilizing process, an energy production process, a resource extraction process, or any combination thereof.

In operation, the industrial automation process 12 may receive one or more inputs 16 used to produce one or more outputs 18. For example, the inputs 16 may include feed stock, electrical energy, fuel, parts, assemblies, sub-assemblies, operational parameters (e.g., sensor measurements), or any combination thereof. Additionally, the outputs 18 may include finished products, semi-finished products, assemblies, manufacturing products, by products, or any combination thereof.

To produce the one or more outputs 18, the control system 14 may control operation of the industrial automation process 12. In some embodiments, the control system 14 may control operation by outputting control signals to instruct one or more automation devices 20 to perform a control action by implementing manipulated variable setpoints. In the depicted embodiment, the automation devices 20 may include any suitable type of device, such as input/output (I/O) modules, motor control centers, motors, human machine interfaces (HMIs), operator interfaces, contactors, starters, drives, relays, protection devices, switchgear, compressors, scanners, gauges, valves, flow meters, and the like. For example, the control system 14 may instruct a motor (e.g., an automation device 20) to implement a control action by actuating at a particular speed (e.g., a manipulated variable setpoint).

In some embodiments, the control system 14 may determine the manipulated variable setpoints based at least in part on process data. As described above, the process data may be indicative of operation of the industrial automation process 12 and, thus, may include operational parameters of an automation device 20 and/or operational parameters of the industrial automation process 12. For example, the operational parameters may include any suitable type, such as temperature, flow rate, electrical power, and the like.

Thus, the control system 14 may receive process data from one or more of the automation devices 20 and/or from one or more sensors. In some embodiments, a sensor may determine an operational parameter and communicate a measurement signal indicating the operational parameter to the control system 14. For example, a temperature sensor may measure temperature of a motor (e.g., an automation device 20) and transmit a measurement signal indicating the measured temperature to the control system 14. As will be described in more detail below, the control system 14 may then analyze the process data to monitor performance of the industrial automation process 12 (e.g., determine an expected operational state) and/or perform diagnostics on the industrial automation process 12.

To facilitate controlling operation and/or performing other functions, the control system 14 may include one or more controllers, such as one or more model predictive control (MPC) controllers, one or more proportional-integral-derivative (PID) controllers, one or more neural network controllers, one or more fuzzy logic controllers, or any combination thereof. For example, in the depicted embodiment, the control system 14 utilizes a distributed architecture with a central controller 24 and multiple local controllers 26.

In some embodiments, the central controller 24 may provide centralized control over operation of the industrial automation process 12. For example, the central controller 24 may enable centralized communication with a user (e.g., operator). To facilitate, the central controller 24 may include a display 28 to facilitate providing information to the user. For example, the display 28 may display visual representations of information, such as process data, selected features, expected operational parameters, and/or relationships therebetween. Additionally, the central controller 24 may include one or more input device 30 to enable receiving input, such as control commands, from the user. Thus, in some embodiments, the input devices 30 may include a keyboard, a button, a touch-sensitive display 28, or the like.

Additionally, the central controller 24 may analyze process data from various portions of the industrial automation process 12 (e.g., using an optimization problem) to determine a control strategy for the industrial automation process 12 as a whole. To facilitate, the central controller may include a processor 32 and memory 34. More specifically, the processor 32 may execute instruction and/or process data stored in memory 34. As such, the processor 32 may include one or more general purpose microprocessors, one or more application specific processors (ASICs), one or more field programmable logic arrays (FPGAs), or any combination thereof. Additionally, the memory 34 may include random access memory (RAM), read only memory (ROM), rewritable flash memory, hard drives, optical discs, and the like. Additionally, in some embodiments, the memory 34 may be remote from the central controller 24, for example, in cloud storage.

On the other hand, the local controller 26 may provide localized control over a portion of the industrial automation process 12. For example, in the depicted embodiment, a first controller 26A may provide control over operation of a first automation device 20A in the automation process 12 and a second controller 26B may provide control over operation of a second automation device 20B in the automation process 12.

To facilitate, the local controllers 26 may each also include a processor 36 and memory 38. More specifically, the processor 36 may execute instruction and/or process data stored in memory 38. As such, the processor 36 may include one or more general purpose microprocessors, one or more application specific processors (ASICs), one or more field programmable logic arrays (FPGAs), or any combination thereof. Additionally, the memory 38 may include random access memory (RAM), read only memory (ROM), rewritable flash memory, hard drives, optical discs, and the like.

In some embodiments, a local controller 26 may control operation of a portion of the industrial automation process 12 based at least in part on the control strategy determined by the central controller 24. Additionally, the central controller 24 may determine the control strategy based at least in part on process data determined by the local controllers 26. Thus, to implement the control strategy, the central controller 24 and the local controllers 26 may be communicatively coupled via a network 40. In the depicted embodiment, the network 40 may be any suitable type, such as an EtherNet/IP network, a ControlNet network, a DeviceNet network, a Data Highway Plus network, a Remote I/O network, a Foundation Fieldbus network, a Serial, DH-485 network, a SynchLink network, or any combination thereof.

It should be appreciated that the described embodiment of the control system 14 is merely intended to be illustrative and not limiting. In other embodiments, the control system 14 may include any number of controllers organized in any suitable architecture. For example, in some embodiments, the control system 14 may include a single controller, multiple central controllers 24, or only local controllers 26.

As described above, the control system 14 may facilitate performance monitoring and/or diagnostics on the industrial automation process 12. For example, the control system 14 may monitor performance by determining expected operational state of the industrial automation process 12. Additionally, the control system 14 may perform diagnostics by determining cause of the expected operational state and/or control actions expected to adjust the operational state of the automation device 12. To facilitate, in some embodiments, the control system 14 may utilize a monitoring and diagnostics system.

Figure 2:
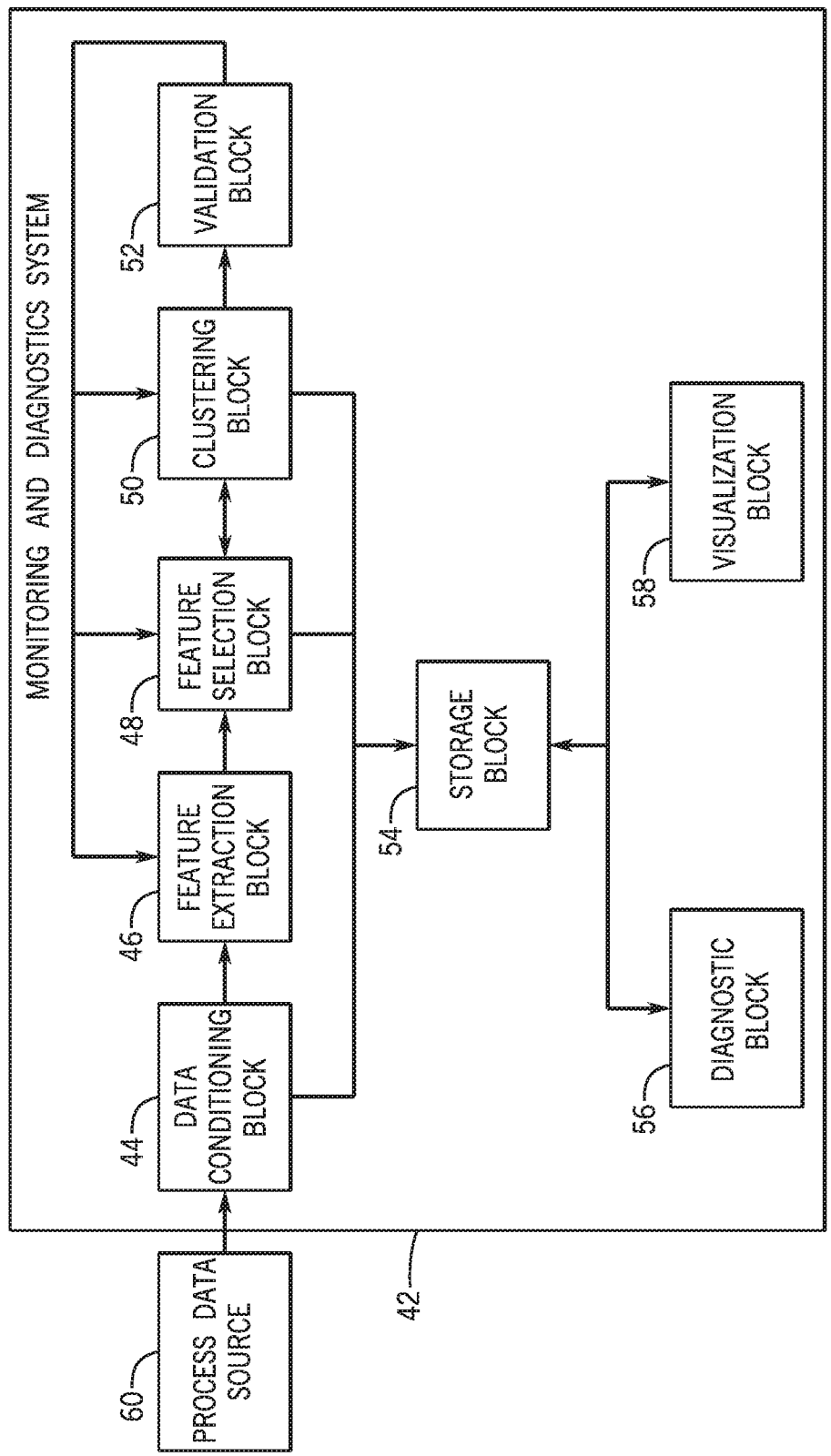
FIG. 2 is a block diagram of a monitoring and diagnostics system used in the control system of FIG. 1, in accordance with an embodiment.

To help illustrate, one embodiment of a monitoring and diagnostics system 42 is described in FIG. 2. As depicted, the monitoring and diagnostics system 42 includes a data conditioning block 44, a feature extraction block 46, a feature selection block 48, a clustering block 50, a validation block 52, a storage block 54, a diagnostic block 56, and a visualization block 58. In some embodiments, the monitoring and diagnostics system 42 may be implemented in a single controller (e.g., a local controller 26 or a central controller 24) or multiple controllers (e.g., any combination of local controllers 24 and central controllers 24).

In the depicted embodiment, the data conditioning block 44 may receive process data from a process data source 60. As described above, the process data may include data that is indicative of operation of the industrial automation process 12, such as operational parameters of one or more automation devices 20 and/or the industrial automation process 12. Thus, in some embodiments, the process source 60 may include one or more controllers (e.g., local controllers 26 and/or central controllers 24), one or more automation devices 20, and/or one or more sensors. The data conditioning block 44 may then process the process data to make it suitable for analysis by the monitoring and diagnostics system 42. For example, the data conditioning block 44 may remove noise from the process data, check validity of the process data, handle missing data from the process data, and/or time synchronize the process data. In some embodiments, the process data received by the monitoring and diagnostics system 42 may not include operator and/or expert input.

The feature extraction block 46 may then receive the conditioned process data from the data conditioning block 44. In some embodiments, the feature extraction block 46 may extract features from the process data, for example, by performing a transform on the process data. Thus, the extracted features may indicate operation of the industrial automation process 12 in a manner different from the process data. In some embodiments, the features may be extracted such that analysis based on the extracted features improves operational efficiency compared to analysis based directly on the process data.

To help illustrate, one embodiment of a process 62 describing operation of the feature extraction block 46 is presented in FIG. 3. Generally, the process 62 includes determining process data (process block 64), determining feature extraction parameters (process block 66), and determining extracted features (process block 68). In some embodiments, the process 62 may be implemented using instructions stored in a tangible, non-transitory, computer-readable medium, such as memory 34 and/or memory 38, executable by processing circuitry, such as the processor 32 and/or processor 36.

Accordingly, in some embodiments, the control system 14 may determine the process data (process block 64). As described above, the control system 14 may receive the process data from the process data source 60. Additionally, the control system 14 may use the data conditioning block 44 to condition the process data such that the process data is suitable for analysis by the monitoring and diagnostics system 42.

A visual representation of one example of process data that may be determined by the control system 14 is described in FIG. 4. As depicted, FIG. 4 is a plot 70 describing load versus position (e.g., process data) of a rod pump (e.g., an automation device 20). More specifically, the plot 70 includes points 72 that indicate load and position of the rod pump measured at different time steps. It should be appreciated that the plot 70 is merely intended to describe a subset of process data determined from operation of the rod pump. For example, the process data may additionally include temperature, power consumption, and/or age of the rod pump.

Returning to the process 62 of FIG. 3, the control system 14 may determine feature extraction parameters used by the feature extraction block 46 (process block 66). In some embodiments, the feature extraction parameters may indicate technique used to extract features from the process data. For example, the feature extraction parameters may indicate whether to use fast-fourier-transform (FFT) analysis, principle correction analysis (PCA), or a leaning machine. Additionally, the feature extraction parameters may indicate process data from which to extract features, for example, based on associated time stamp and/or source.

Based on the feature extraction parameters, the control system 14 may use the feature extraction block 46 to extract features from the process data (process block 68). As described above, the process data may be indicative of operation of the industrial automation process 12. In some embodiments, the feature extraction block 46 may extract features by transforming the process data based on the feature extraction parameters. For example, the feature extraction block 46 may extract features by transforming time domain process data indicated by the feature extraction parameters into the frequency domain when the feature extraction parameters indicates a fast-fourier-transform analysis feature extraction technique. In this manner, the feature extraction block 46 may extract features so that the extracted features are indicative of operation of the industrial automation process 12 in a manner that improves analytical efficiency.

As described above, a large amount of process data may be determined from an industrial automation process 12, particularly when complexity (e.g., number of automation components 20, frequency of sampling, and/or number of number of sensors) increases. Since the extracted features are determined from the process data, a large number of features may be extracted. Thus, processing the extracted features may still limit analytical efficiency and, thus, possibly ability to monitor performance and/or perform diagnostics in real-time or near real-time.

Accordingly, the feature selection block 48 may receive the extracted features from the feature extraction block 46 and select a subset of the extracted features. In some embodiments, the feature selection block 48 may determine expected affect each extracted feature is expected to have on operational state of the industrial automation process 12.

Accordingly, the feature selection block 48 may select features based at least in part on this determination so that the selected features are still largely representative of operation of the industrial automation process 12. It is also possible that the feature selection block uses the eventual goal of the performance monitoring task (e.g. separation of two states of the operation indicating normal and abnormal operational states) to systematically search among the extracted features to select one or more features that can sufficiently separate the normal and abnormal operation state. In this manner, operational efficiency of the monitoring and diagnostics system 42 may be improved by reducing amount of data analyzed while still being representative of operation of the industrial automation process 12.

Figure 5:
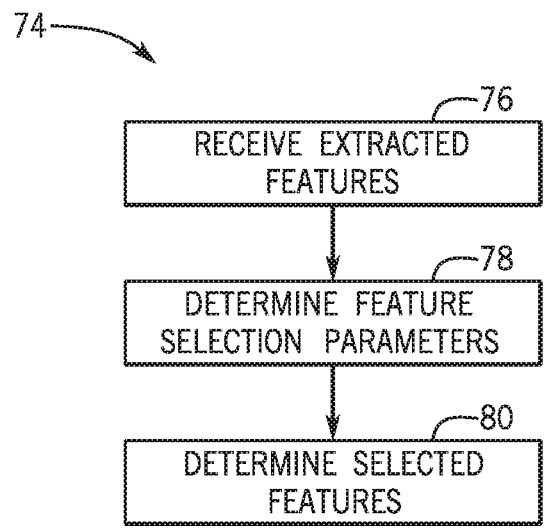
FIG. 5 is a flow diagram of a process for operating a feature selection block of the monitoring and diagnostic system of FIG. 2, in accordance with an embodiment.

To help illustrate, one embodiment of a process 74 describing operation of the feature selection block 48 is presented in FIG. 5. Generally, the process 74 includes receiving extracted features (process block 76), determining feature selection parameters (process block 78), and determining selected features (process block 80). In some embodiments, the process 74 may be implemented using instructions stored in a tangible, non-transitory, computer-readable medium, such as memory 34 and/or memory 38, executable by processing circuitry, such as the processor 32 and/or processor 36.

Accordingly, in some embodiments, the control system 14 may use the feature selection block 48 to receive extracted features from the feature extraction block 46 (process block 76) and determine feature selection parameters (process block 78). In some embodiments, the feature selection parameters may include parameters used by the feature selection block 48 to select features from the extracted features. For example, the feature selection parameters may include number and/or type of features to select. In some embodiments, the feature selection parameters may be input to the control system 14, for example, by a user via an input device 30. In other embodiments, the control system 14 may determine the feature selection parameters (e.g., by executing an optimization problem), which may facilitate reducing reliance on user knowledge.

Figure 6:
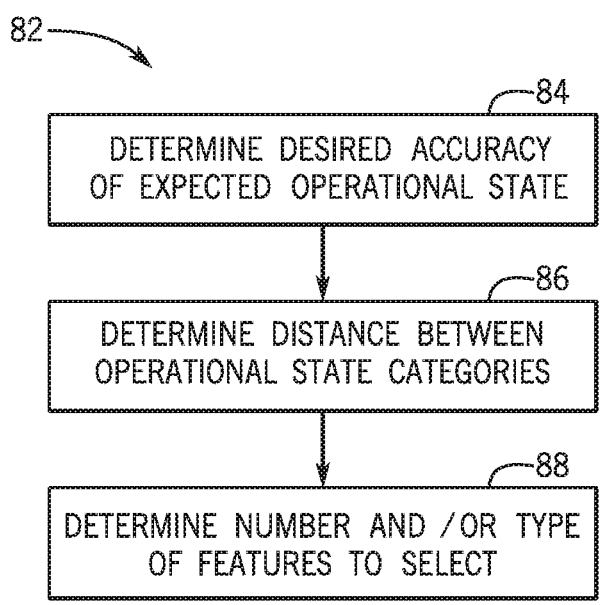
FIG. 6 is a flow diagram of a process for determining feature selection parameters used by the feature selection block, in accordance with an embodiment.

To help illustrate, one embodiment of a process 76 that may be used by the control system 14 to determine feature selection parameters is described in FIG. 6. Generally, the process 82 includes determining desired accuracy of an expected operational state (process block 84), determining distance between operational state categories (process block 86), and determining number and/or type of features to select (process block 88). In some embodiments, the process 82 may be implemented using instructions stored in a tangible, non-transitory, computer-readable medium, such as memory 34 and/or memory 38, executable by processing circuitry, such as the processor 32 and/or processor 36.

Accordingly, in some embodiments, the control system 14 may determine desired accuracy of an expected operational state determination (process block 84). In some embodiments, the desired accuracy may be predetermined. Additionally or alternatively, the desired accuracy may be adjusted by a user via the input devices 30.

Additionally, the control system 14 may determine distance between operational state categories (process block 86). As will be described in more detail below, an operational state category may be associated with an operational state and metric values expected to result from the operational state. Thus, in some embodiments, the clustering block 50 may determine a metric based at least in part on the selected features and determine an expected operational state based at least in part on the metric value and expected metric values associated with various operational state categories. Thus, in such embodiments, the control system 14 may determine distance between the expected metric values associated with the various operational state categories.

The control system 14 may then determine feature selection parameters (e.g., number and/or type) based at least in part on the desired accuracy and/or distance between the operational state categories (process block 88). In some embodiments, the control system may execute an optimization search (e.g., problem) to increase distance between the operational state categories and, thus, improve accuracy of the expected operational state. For example, in the optimization search, the control system may compare possible sets of feature selection parameters using an objective function.

In this manner, the control system 14 may determine the set of feature selection parameters that is expected to achieve the desired accuracy of the expected operational state. For example, the control system 14 may increase number of selected features to improve accuracy. Additionally, the control system 14 may adjust type of features selected (e.g., based on source) so that features expected to have a larger impact on operational state of the industrial automation process 12 are selected.

Returning to the process 74 described in FIG. 5, the control system 14 may use the feature selection block 48 to determine selected features based at least in part on the feature selection parameters (process block 80). As described above, the feature selection parameters may indicate which features to select from the extracted features, for example, by specifying number and/or type (e.g., source) of features to select. In this manner, the feature selection block 48 may determine selected features that are sufficiently representative of operation of the industrial automation process 12 to determine the expected operational state at least with the desired accuracy while reducing amount (e.g., dimensions) of analyzed data.

To determine the expected operational state, the clustering block 50 received the selected features from the features selection block 48. As described above, the clustering block 50 may analyze the selected features to determine the expected operational state of the industrial automation process 12. In some embodiments, the clustering block 50 may determine a metric based at least in part on the selected features. In such embodiments, metric values expected to result from an operational state (e.g., a range or area) may be associated with a corresponding operational state category. Accordingly, the clustering block 50 may determine expected operational parameter based at least in part on what area or range the metric value falls within. Additionally, in some embodiments, the clustering block 50 may adjust the determination of the expected operational state, for example, by defining additional operational state categories and/or adjusting area or range corresponding with an operational state category.

Figure 7:
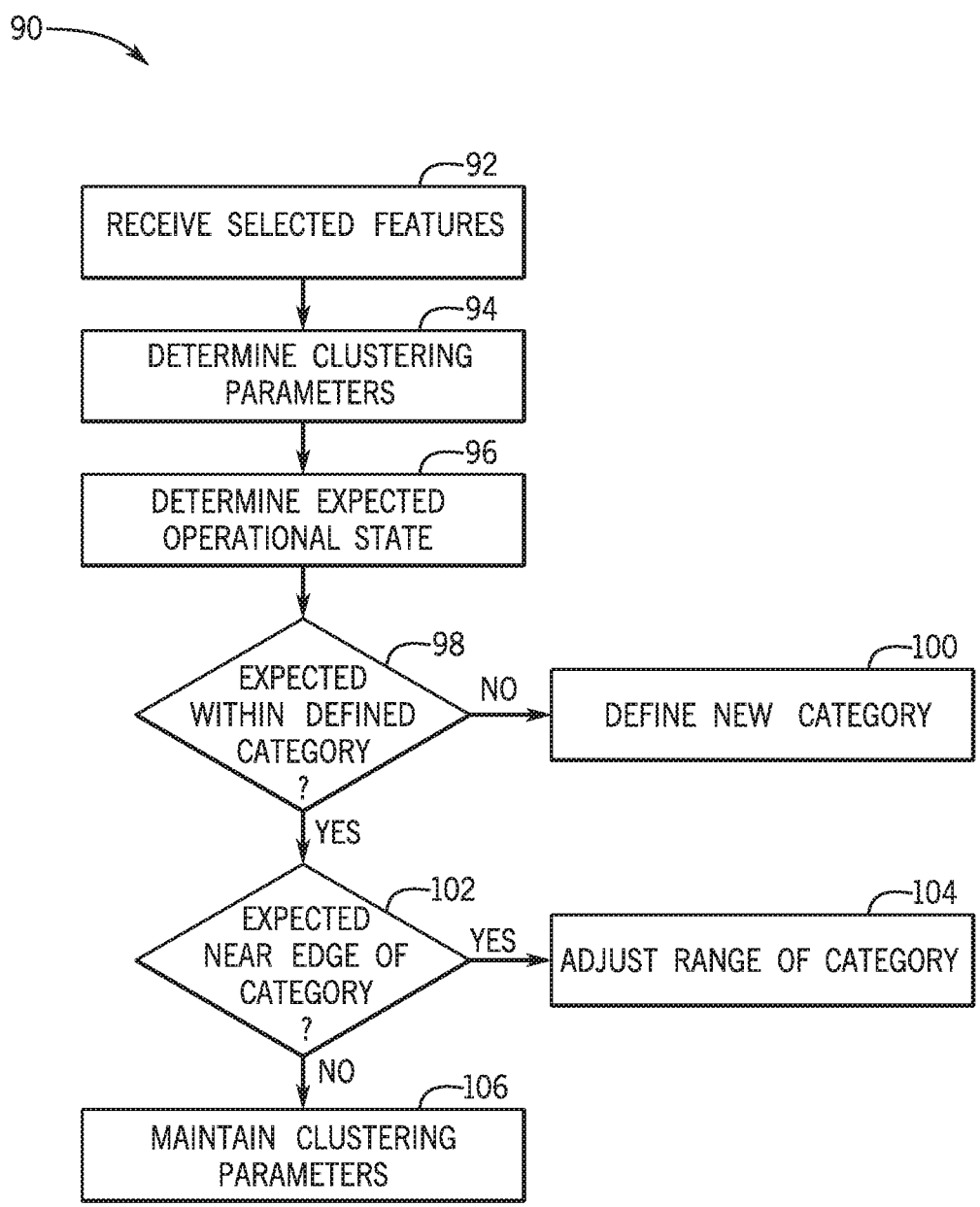
FIG. 7 is a flow diagram of a process for operating a clustering block of the monitoring and diagnostic system of FIG. 2, in accordance with an embodiment.

To help illustrate, one embodiment of a process 90 that describes operation of the clustering block 50 is described in FIG. 7. Generally, the process 90 includes receiving selected features (process block 92), determining clustering parameters (process block 94), determining an expected operational state (process block 96), determining whether the expected operational state is within a defining operational state category (decision block 102), and defining a new operational state category when not within a defined operational state category (process block 100). When within a defined operational state category, the process 90 includes determining whether a metric used to determine the expected operational state is near an edge of the operational state category (decision block 102), adjusting metric value range of the operational state category when the metric is near the edge (process block 104), and maintaining the clustering parameters when metric is not near the edge (process block 106). In some embodiments, the process 90 may be implemented using instructions stored in a tangible, non-transitory, computer-readable medium, such as memory 34 and/or memory 38, executable by processing circuitry, such as the processor 32 and/or processor 36.

Accordingly, in some embodiments, the control system 14 may use the clustering block 50 to receive the selected features from the feature selection block 48 (process block 92) and determine the clustering parameters (process block 94). In some embodiments, the clustering parameters may include parameters used by the clustering block to determine the expected operational parameter based on the selected features. For example, the clustering parameters may include a mapping used to map the selected features to a metric (e.g., into a feature space) such that value of the metric indicates the expected operational state. Additionally, the clustering parameters may include metric values (e.g., expressed as an area or rage) associated with various operational state categories.

Based at least in part on the clustering parameters and the selected features, the control system 14 may use the clustering block 50 to determine the expected operational state of the industrial automation process 12 (process block 96). In some embodiments, the clustering block 50 may map the selected features into a feature space to determine a metric that is expected to be indicative of the operational state of the industrial automation process 12. Thus, in such embodiments, the clustering block 50 may determine the expected operational state based on value of the metric.

To help illustrate, a visual representation of one example of metric values that may be determined by the clustering block 50 is described in FIG. 8A. As depicted, FIG. 8A is a plot 108A including points 110 that indicate determined metric values based on a first selected feature (e.g., x-axis) and a second selected feature (e.g., y-axis). Additionally, the plot 108A includes highlighted areas 112 that indicate metric values associated with various known (e.g., defined) operational state categories.

For example, the plot 108A includes a first area 112A that indicates metric values associated with a normal operational mode, a second area 112B that indicates metric values associated with a gas interference operational state, and a third area 112C that indicates metric values associated with a fluid pound operational state. Thus, when a metric value indicated by a first point 110A is determined, the clustering block 50 may determine that the industrial automation process 12 is expected to be in the normal operational state. Additionally, when a metric value indicated by a second point 110B is determined, the clustering block 50 may determine that the industrial automation process 12 is expected to be in the gas in the gas interference operational state. Furthermore, when a metric value indicated by a third point 110C is determined, the clustering block 50 may determine that the industrial automation process 12 is expected to be in the fluid pound operational state.

In some embodiments, the industrial automation process 12 may be in one of a large number of operational states, some of which may not be previously anticipated (e.g., known or defined). Thus, in some instances, the metric may fall outside of the highlighted areas 112 and, thus, the expected operational state may be different from the known operational state categories. For example, when a metric value indicated by a fourth point 110D is determined, the clustering block 50 may determine that the industrial automation process 12 is expected to be in an unknown operational state. In some embodiments, a threshold for separation of clusters and a cost for the addition of a new cluster can be defined. In such embodiments, the monitoring and diagnostics system 42 may automatically cluster unknown operational states into sub-clusters with significant closeness in the selected features, for example, to facilitate subsequent labeling by an expert.

In addition to an expected current operational state, the clustering block 50 may determine an expected trajectory of the operational state over a control horizon. In other words, based on the selected features, the clustering block 50 may predict how the expected operational state is expected to change during subsequent time steps. In some embodiments, the trajectory of the expected operational state may be determined based at least in part on expected trajectory of metric value over the control horizon.

To help illustrate, a visual representation of one example of a metric trajectory over a control horizon that may be determined by the clustering block 50 is described in FIG. 8B. As depicted, FIG. 8B is a plot 108B including the points 110 from FIG. 8A and trajectory points 114 that indicate expected trajectory of the metric value indicated by the first point 110A over a control horizon. For example, a first trajectory point 114A may indicate expected metric value at a first time step in the control horizon. Based on the first trajectory points 114A, the clustering block 50 may determine that the industrial automation process 12 is expected to be in an unknown operational state at the first time step. Additionally, a second trajectory point 114B may indicate expected metric value at a second time step in the control horizon. Based on the second trajectory point 114B, the clustering block 50 may determine that industrial automation process 12 is expected to be in the fluid pound operational state at the second time step. As will be described in more detail below, trajectory of the expected operational state may facilitate diagnostics.

Returning to the process 90 of FIG. 7, the control system 14 may use the clustering block 50 to define an additional operational state category when the expected operational state is not within a previously defined category (process block 100). In some embodiments, the clustering block 50 may determine an operational state and/or metric values (e.g., range or area) associated with the additional category. For example, the control system 14 may notify a user (e.g., using the display 28) of the additional category and request input of an associated operational state and/or an associated metric value area or range. The clustering block 50 may then define the additional category based at least in part on the user inputs.

Additionally or alternatively, the clustering block 50 may automatically determine an operational state (e.g., unknown operational state) and define the corresponding metric value area based at least in part on the metric value that resulted in the additional category. For example, with regard to FIG. 8A, the clustering block 50 may define an additional category and associate the additional category with an unknown operational state and a metric value area that includes a region around the metric value indicated by the fourth point 110D.

In subsequent operation, the clustering block 50 may determine that the expected operational state is the newly defined operational state when the resulting metric falls within the corresponding area. Thus, in some embodiments, the clustering block 50 may define the operational state categories at least partially empirically based on prior operation of the industrial automation process 12. In this manner, the control system 14 may facilitate determining expected operational state of the industrial automation process 12 with reduced reliance on user knowledge.

Returning to the process 90 of FIG. 7, the control system 14 may use the clustering block 50 to determine whether the metric value indicating the expected operational state is near an edge (e.g., boundary) of the category (decision block 102). In some embodiments, the clustering block 50 may determine whether the metric value is near an edge by determining whether the metric value is greater than a threshold distance from the edge. Since determined at least in part empirically, the metric value ranges may not completely define all of the metric values that could result when the industrial automation process 12 is in a particular operational state. In other words, the metric value resulting from when in the particular operational state may fall outside of the metric value area associated with the corresponding operational state category.

Thus, when the resulting metric is not near the edge of a range, the control system 14 may use the clustering block 50 to maintain the clustering parameters (process block (process block 106). On the other hand, when the metric is near an edge of a defined area, the control system 14 may use the clustering block 50 to adjust the area associated with the category (process block 104). Generally, a resulting metric value may be near other metric values determined when in the same operational state. Thus, a metric value near an edge of the range may indicate that other metric values resulting from the same operational state may be close, but outside of the defined area.

As such, the clustering block 50 may expand the range around the metric value so that other metric values near the metric value may be classified as the same expected operational state. For example, with regard to FIG. 8A, the clustering block 50 may determine that industrial automation process 12 is expected to be in the normal operational state when a metric value corresponding with a fifth point 110E is determined. Additionally, the clustering block 50 may determine that other metric values resulting from the normal operational state may fall near the metric value. Thus, the clustering block 50 may expand the first area 112A around the fifth point 110E, for example, so that the clustering block 50 may determine that the industrial automation process 12 is expected to be in the normal operational state when a metric value indicated by a sixth point 110F is determined.

Furthermore, since metric values resulting from the same operational state generally fall near one another, the likelihood of a subsequent metric value resulting from the same operational state falling in a region may increase as number of metric values in that region increase. Thus, in some embodiments, the clustering block 50 may monitor trend of metric values and adjust area associated with corresponding categories accordingly. For example, as number of metric values in a region near an edge of the defined range increase, the clustering block 50 may increase expansion of the metric value area around that region and/or reduce the metric value area in other regions. In this manner, the control system 14 may automatically adjust determination of the expected operational state of the industrial automation process 12, thereby reducing reliance on user knowledge.

To further reduce reliance on user knowledge, the control system 14 may automatically adjust the feature extraction parameters, the feature selection parameters, and/or the clustering parameters to improve accuracy of the monitoring and diagnostics system 42. To facilitate, in the embodiment depicted in FIG. 2, the validation block 52 may determine an error between the expected operational state and an actual operational state of the industrial automation process 12. Based on the error, the feature extraction block 46 may adjust the feature extraction parameters, the feature selection block 48 may adjust the feature selection parameters, and/or the clustering block 50 may adjust the clustering parameters. Thus, as depicted, the validation block 52 may feedback the error to the feature extraction block 46, the feature selection block 48, and/or the clustering block 50.

To help illustrate, one embodiment of a process 108 describing operation of the validation block 52 is presented in FIG. 9. Generally, the process 108 includes receiving an expected operational state (process block 118), determining an actual operational state (process block 120), determining an error between the expected operational state and the actual operational state (process block 122), determining whether the error is greater than a threshold (decision block 124), maintaining feature extraction parameters, feature selection parameters, and/or clustering parameters when the error is not greater than a threshold (process block 126), and adjusting the feature extraction parameters, the feature selection parameters, and/or the clustering parameters when the error is greater than the threshold (process block 128). In some embodiments, the process 108 may be implemented using instructions stored in a tangible, non-transitory, computer-readable medium, such as memory 34 and/or memory 38, executable by processing circuitry, such as the processor 32 and/or processor 36.

Accordingly, in some embodiments, the control system 14 may use the validation block 52 to receive the expected operational state from the clustering block 50 (process block 118). As described above, the clustering block 50 may determine an expected trajectory of the operational state over a control horizon. In such embodiments, the validation block 52 may receive any combination of an expected current operational state and one or more expected future operational states (e.g., expected operational states at subsequent time steps).

Additionally, the control system 14 may use the validation block 52 to determine an actual operational state of the industrial automation process 12 (process block 120). In some embodiments, the actual operational state may be user input to the control system 14 via input devices 30. Additionally or alternatively, the actual operational state may be an expected operational state determined at a subsequent time step. For example, at a first time step, the clustering block 50 may determine a first expected trajectory of the operational state, which indicates the expected operational state of the industrial automation process 12 at the first (e.g., current) time step and a second (e.g., subsequent) time step. When the second time step is reached, the clustering block 50 may determine a second expected trajectory of the operational state, which indicates the expected operational state of the industrial automation process at the second (e.g., current) time step and a third (e.g., subsequent) time step. In such instances, the expected operational state may be the expected operational state for the second time step determined at the first time step and the actual operational state may be the expected operational state for the second time step determined at the second time step.

The control system 14 may then use the validation block 52 to determine an error between the expected operational state and the actual operational state (process block 122). In some embodiments, the validation block 52 may determine the error based at least in part on percentage when the expected and actual operational states match. Additionally or alternatively, the validation block 52 may determine the error based at least in part on difference between a first metric value used to determine the expected operational state and a second metric value used to determine the actual operational state.

The control system 14 may then use the validation block 52 to determine whether the error is greater than an error threshold (decision block 124). In some embodiments, the control system 14 may control operation of the industrial automation process 12 based at least in part on the expected operational state. For example, as will be described in more detail below, the control system 14 may determine diagnostics based on the expected operational state and automatically perform operations (e.g., control actions) in the industrial automation process 12 based on the diagnostics. Thus, in some embodiments, the error threshold may be set to indicate minimum accuracy of the expected operational state determination acceptable for use to control operation of the industrial automation process 12.

Thus, when not greater than the error threshold, the accuracy of the expected operational state may be acceptable and, thus, the control system 14 may maintain the feature extraction parameters, the feature selection parameters, and/or the clustering parameters (process block 126). On the other hand, when greater than the error threshold, the control system 14 may adjust the feature extraction parameters, the feature selection parameters, and/or the clustering parameters to reduce error, thereby improving accuracy of the expected operational state determination (process block 128). In some embodiments, the control system 14 may use the validation block 52 to feedback the error to the feature extraction block 46 to enable the feature extraction block 46 to adjust the feature extraction parameters. For example, based on the error, the feature extraction block 46 may adjust technique used to extract features from the process data and/or parameters used to execute the technique (e.g., process data from which to extract features).

Additionally, in some embodiments, the control system 14 may use the validation block 52 to feedback the error to the feature selection block 48 to enable the feature selection block 48 to adjust the feature selection parameters. For example, based on the error, the feature extraction block 48 may increase number of features selected from the extracted features to improve accuracy. Additionally or alternatively, based on the error, the feature extraction bock 48 may adjust type (e.g., based on source) features selected to improve accuracy.

Furthermore, in some embodiments, the control system 14 may use the validation block 52 to feedback the error to the clustering block 50 to enable the clustering block 50 to adjust the clustering parameters. For example, when the error indicates that the expected operational state and actual operational state do not match, the clustering block may adjust metric value area of corresponding operational state categories such that, in subsequent operation, the clustering block 50 will identify the category corresponding with the actual operational state when a metric value, which resulted in the expected operational state being determined, is received. Thus, in some embodiments, the clustering block 50 may increase metric value area associated with the actual operational state and/or reduce metric value area associated with the actual operational state. Additionally, based on the error, the clustering block 50 may adjust mapping of the selected features to the metric (e.g., into the feature space). In this manner, the control system 14 may automatically monitoring performance (e.g., determine the expected operational state) of the industrial automation process 12, thereby reducing reliance of user knowledge.

As described above, in addition to performance monitoring, the monitoring and diagnostics system 42 may facilitate performing diagnostics on the industrial automation process 12 and/or present determined information to a user. In some embodiments, the diagnostics and/or presentation of information may be based at least in part on the process data, the selected features, and/or the expected operational state. To facilitate, in the embodiment depicted in FIG. 2, the data conditioning block 44, the feature selection block 48, and the clustering block 50 are communicatively coupled to the storage block 54. In some embodiments, the storage block 54 may be included in memory 34, memory 38, and/or another suitable tangible, non-transitory, computer-readable medium.

Thus, the storage block 54 may receive and store conditioned process data from the data conditioning block 44, selected features from the feature selection block 48, and/or expected operational state from the clustering block 50. In this manner, the storage block 54 may store currently and/or previously determined conditioned process data, selected features, and/or expected operational state trajectories. To facilitate diagnostics, the storage block 54 may transmit stored conditioned process data, selected features, and/or expected operational states to the diagnostic block 56. In some embodiments, the diagnostic block 56 may analyze the received data to determine an expected cause of the expected operational state. Additionally, the diagnostic block 56 may determine control actions based on the determined cause that may be implemented to adjust operational state of the industrial automation process 12.

To help illustrate, one embodiment of a process 130 describing operation of the diagnostic block 56 is presented in FIG. 10. Generally, the process 130 includes receiving process data (process block 132), receiving selected features (process block 134), receiving expected operational state trajectory (process block 136), performing a root cause analysis (process block 138), and determining a control action (process block 140). In some embodiments, the process 130 may be implemented using instructions stored in a tangible, non-transitory, computer-readable medium, such as memory 34 and/or memory 38, executable by processing circuitry, such as the processor 32 and/or processor 36.

Accordingly, in some embodiments, the control system 14 may use the diagnostic block 56 to receive conditioned process data (process block 132), selected features (process block 134), and/or expected operational state trajectory (process block 136). As described above, in some embodiments, the diagnostic block 56 may receive the current and previous conditioned process data, selected features, and/or expected operational state trajectories from the storage block 54. In other embodiments, the diagnostic block 56 may receive conditioned process data directly from the data conditioning bock 44, selected features directly from the feature selection block 48, expected operational state trajectory directly from the clustering block 50, or any combination thereof.

Based on the received data, the control system 14 may use the diagnostic block 56 to perform a root cause analysis (RCA) (process block 138). In some embodiments, the diagnostic block 56 may perform the root cause analysis to determine expected cause of the expected operational state trajectory. For example, the diagnostic block 56 may determine that a determined gas interference operational state is expected to be caused by improper operation of a bottomhole gas separator in a rod pump. Additionally, the diagnostic block 56 may determine a determined fluid point operational state is expected to be caused by improper operation of bottomhole pump in the rod pump, a pump stroke that is too long, and/or pumping speed that is too fast.

In some embodiments, accuracy of the root cause analysis may be improved by analyzing trends in the conditioned process data, selected features, and/or expected operational state trajectory. For example, the diagnostic block 56 may perform the root cause analysis based at least in part on expected current operational state of industrial automation process 12, expected future operational state of the industrial automation process 12, expected changes in the operational state of the industrial automation process 12 over a control horizon, or any combination thereof. Thus, performing the root cause analysis using an expected operational state trajectory, which includes an expected operational state at a current time step and at future time steps, may facilitate improving accuracy of the root cause analysis.

The control system 14 may then use the diagnostic block 56 to determine control actions that may be implemented in the industrial automation process 12 based at least in part on results of the root cause analysis (process block 140). In some embodiments, the diagnostic block 56 may determine control actions expected to adjust a current operational state to a desired operational state. For example, when the industrial automation process 12 is expected to be in the fluid pound operational state at a current time step, the diagnostic block 56 may determine a control action instructing the rod pump (e.g., an automation device 20) to slow pumping speed, shorten pumping stroke, and/or run a test on the bottomhole pump.

Additionally, since the expected operational state trajectory indicates operational state of the industrial automation process 12 expected at future time steps, the diagnostic block 56 may determine control actions that preemptively adjust operation of the industrial automation process 12. For example, when it is determined the industrial automation process 12 is expected to be in the normal operational state at a current time step, but is expected to gradually transition to the fluid pound operational state, the diagnostic block 56 may determine control actions that gradually reduce pumping speed, gradually shorten pumping stroke, and/or preemptively test the bottomhole pump. In this manner, the control system 14 may facilitate increasing duration the industrial automation process 12 is in a desired (e.g., normal) operational state.

In some embodiments, the control system 14 may inform a user of the control actions determined by the diagnostic block 56, for example, as visual representations (e.g., text and/or images) on the display 28. For example, in some embodiments, the controls system 14 may present the control actions to the user and wait for approval from the user before implementing the control actions. In other embodiments, the control system 14 may automatically implement the control actions, thereby reducing reliance on user knowledge.

To facilitate display, the determined control actions may be communicated to the visualization block 58. For example, in the embodiment described in FIG. 2, the control actions may be transmitted from the diagnostic block 56 to the storage block 54 for storage. In this manner, the storage block 54 may store currently and/or previously determined control actions. The storage block 54 may then transmit stored control actions to the visualization block 58.

In addition to the control actions, the visualization block 58 may facilitate display of process data, selected features, and/or expected operational state trajectories. Thus, in the embodiment described in FIG. 2, the storage block 54 may transmit current and/or previously determined conditioned process data, selected features, and/or expected operational state trajectories to the visualization block 58. The visualization block 58 may then facilitate presentation of received data by determining a visual representation (e.g., text and/or images) of the data that may be displayed on the display 28.

Figure 11:
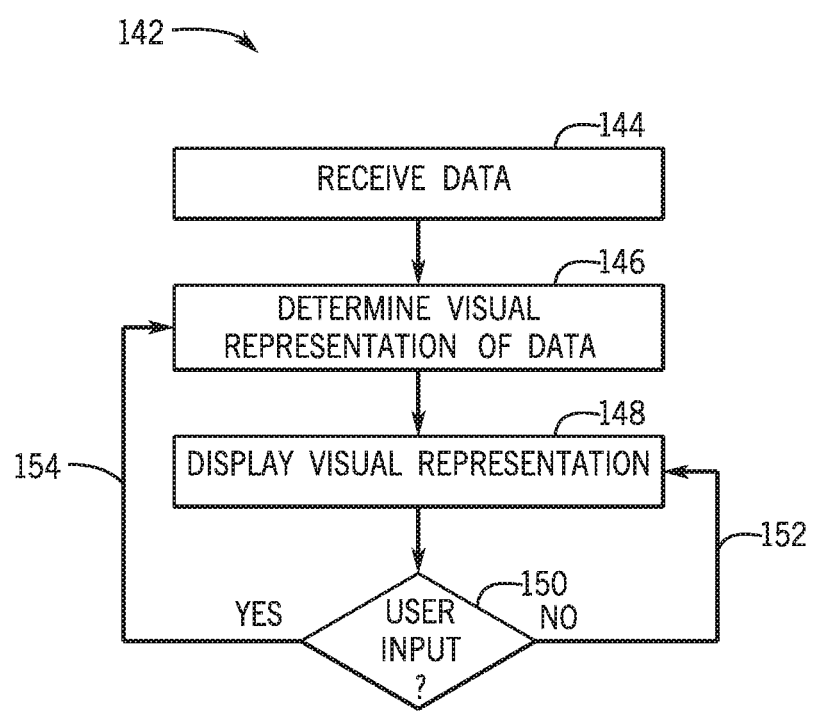
FIG. 11 is a flow diagram of a process for operating a visualization block of the monitoring and diagnostic system of FIG. 2, in accordance with an embodiment.

To help illustrate, one embodiment of a process 142 describing operation of the visualization block 58 is presented in FIG. 11. Generally, the process 142 includes receiving data (process block 144), determining a visual representation of the data (process block 146), displaying the visual representation (process block 148), determining whether a user input is detected (decision block 150), continuing display of the visual representation when a user input is not detected (arrow 152), and determining another visual representation when a user input is detected (arrow 154). In some embodiments, the process 142 may be implemented using instructions stored in a tangible, non-transitory, computer-readable medium, such as memory 34 and/or memory 38, executable by processing circuitry, such as the processor 32 and/or processor 36.

Accordingly, in some embodiments, the control system 14 may use the visualization block 58 to receive data to be displayed (process block 144). As described above, the data to be displayed may include control actions, selected features, process data, and/or expected operational state trajectories. In embodiments such as FIG. 2, the visualization block 58 may receive the data from the storage block 54. In other embodiments, the visualization block 58 may receive the control actions directly from the diagnostic block 56, the conditioned process data directly from the data conditioning block 44, the selected features directly from the feature selection block 48, the expected operational state trajectories directly from the clustering block 50, or any combination thereof.

The control system 14 may then determine a visual representation of at least a portion of the received data (process block 146). In some embodiments, the visual representation may include text that, for example, indicates an expected operational state, value of process data, information determined based on the process data (e.g., the metric used to determine expected operational state), and/or a control action. Additionally, in some embodiments, the visual representation may include images, such as a plot or graph, which indicates relationship between various pieces of the received data.

For example, the visualization block 58 may generate the plot 70 depicted in FIG. 4 to provide a visual representation of relationship between load process data and position process data. Additionally, the visualization block 58 may generate the plot 108A depicted in FIG. 8A to provide a visual representation of relationship between a metric used to determine an expected operational state and two selected features used to determine the metric. Furthermore, the visualization block 58 may generate the plot 108B depicted in FIG. 8B to provide a visual representation of relationship between trajectory of the metric and the two selected features over a control horizon.

Returning to the process 142 of FIG. 11, the control system 14 may use the display 28 to display the visual representation determined by the visualization block 58 (process block 148). In some embodiments, the visualization block 58 may transmit the visual representations to the storage block 54 for storage and the storage block 54 may transmit the visual representation to the display 12. In other embodiments, the visualization block 58 may transmit the visual representations directly to the display 28.

After displayed, the control system 14 may use the input devices 30 to determine whether a user input is detected (decision block 152). In some embodiments, a user input may interact with the displayed visual representation, for example, to request display of additional related information. Thus, when a user input is not detected, the control system 14 may use the display 28 to continue displaying the visual representation (arrow 152).

On the other hand, when a user input is detected, the control system 14 may use the visualization block 58 to determine another visual representation based on the user input (arrow 154). The visual representation may then be displayed on the display 28. In this manner, the control system 14 may improve presentation of information determined by monitoring and diagnostics system 42, for example, by enabling a user to view additional related information.

Figure 12:
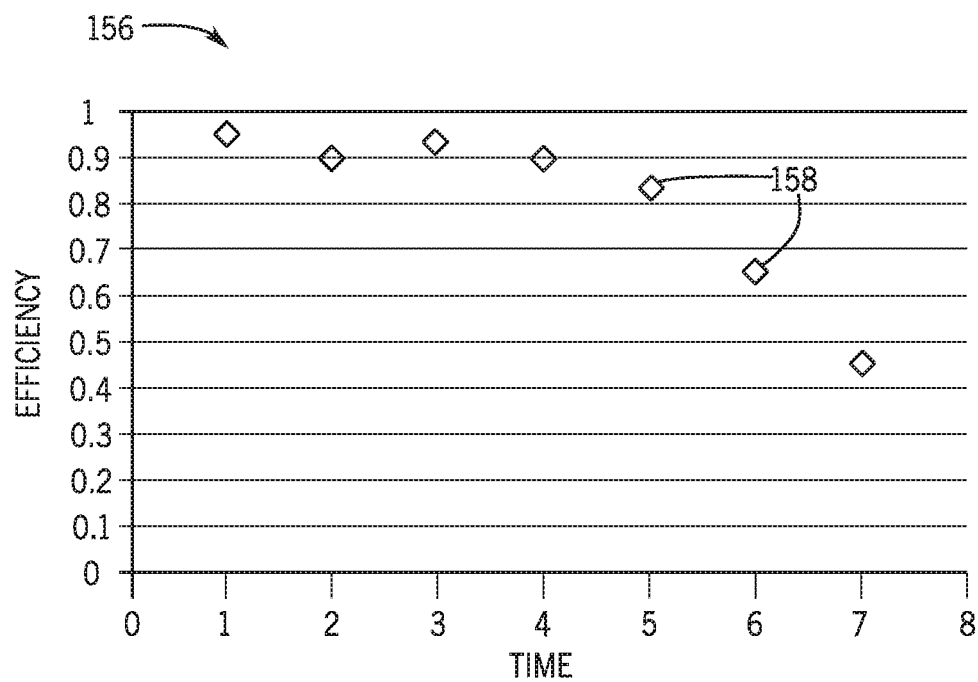
FIG. 12 is an example efficiency plot generated by the visualization block, in accordance with an embodiment.

To help illustrate, one example of a plot 156 (e.g., visual representation) that may be displayed is described in FIG. 12. More specifically, the plot 156 includes points 158 that indicate efficiency of a rod pump at each time step between time zero and time eight. As depicted, efficiency of the rod pump begins to drop after time four, which may indicate that the rod pump is transitioning from the normal operational state to the fluid pound operational state or the gas interference operational state. Since both operational states may result in a decrease in efficiency, a user may desire to view additional information related to the efficiency of the rod pump, such fuel consumption and output power of the rod pump.

Figure 13:
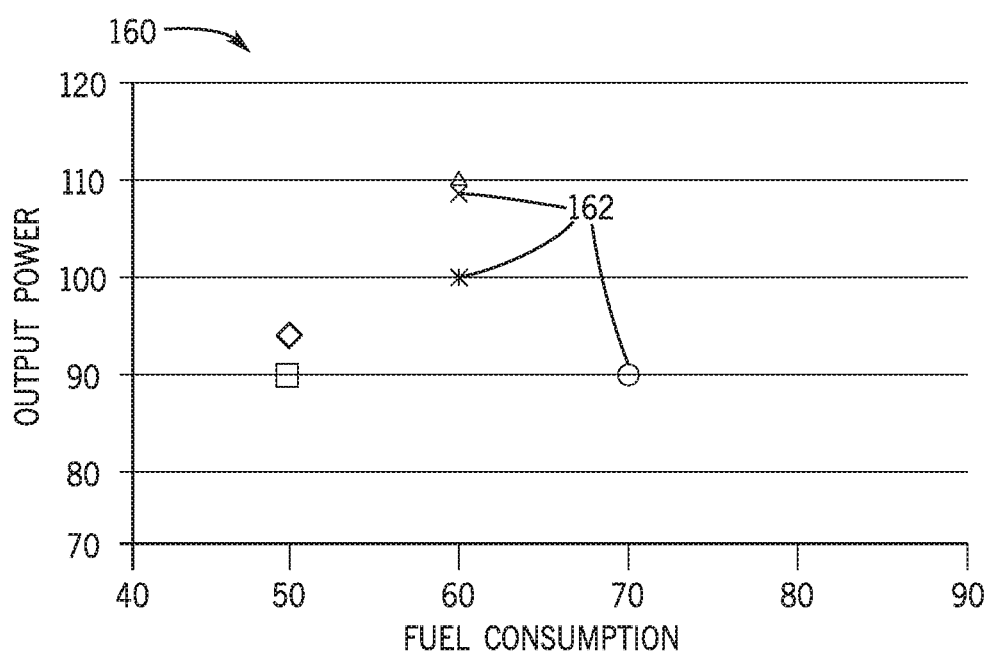
FIG. 13 is an example fuel consumption versus output power plot generated the visualization block, in accordance with an embodiment.

When a user input indicating desire to view additional information is received, the control system 14 may use the visualization block to generate a visual representation of the additional information. One example of a plot 160 (e.g., visual representation) that may be generated and displayed is described in FIG. 13. More specifically, the plot 160 includes points 162 that indicate output power and fuel consumption at each time step. Based on the plot 160, the user may better determine the actual operational state (e.g., whether in the fluid pound operational state or gas interference operational state) of the rod pump.

In addition to performance monitoring and diagnostics, the techniques described herein may be utilized in other contexts. For example, the techniques may be used to automatically create a process model describing operation of the industrial automation process 12. In some embodiments, the process model may indicate an expected value of a target variable (e.g., controlled variable or output 18) based on one or more selected features and/or the process data, which may be automatically determined through systematic optimization without operator and/or human input.

Figure 14:
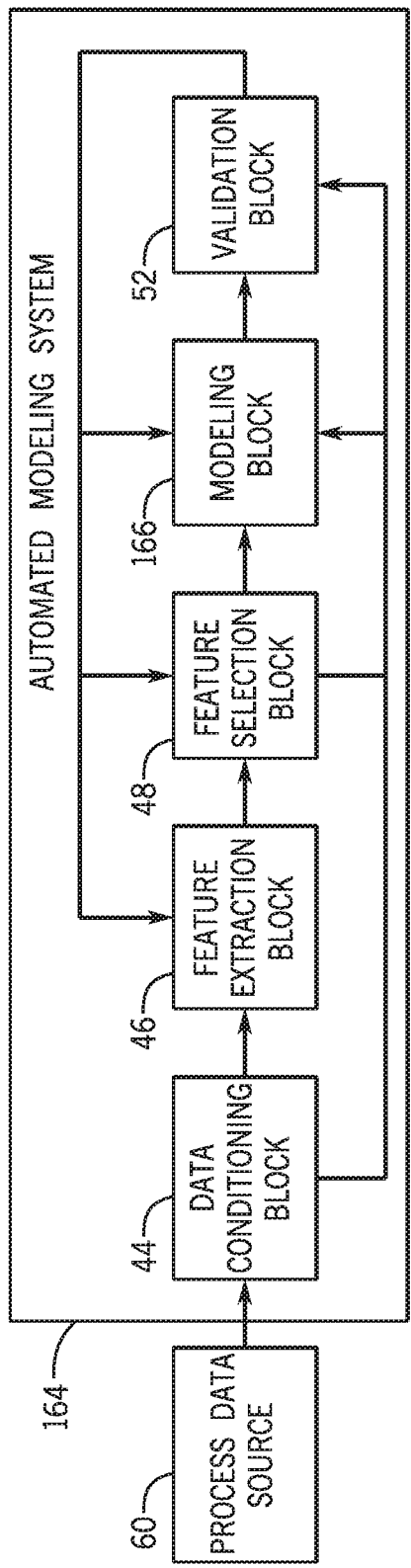
FIG. 14 is a block diagram of a modeling system used in the control system of FIG. 1, in accordance with an embodiment.

To help illustrate, one embodiment of an automated modeling system 164 is described in FIG. 14. In the depicted embodiment, the automated modeling system 164 generally includes the same or similar blocks as the monitoring and diagnostics system 42 described above. For example, as depicted, the automated modeling system 164 includes the data conditioning block 44, the feature extraction block 46, the feature selection block 48, and the validation block 52. However, instead of the clustering block 50, the automated modeling system 164 includes a modeling block 166. In some embodiments, the modeling block 166 may automatically determine a process model and/or evaluate robustness of process model. In such embodiments, the modeling block 166 may improve robustness of the selection of process data (e.g., process inputs 16) and/or selected features and determination of functional dependencies with a target variable modeled by the process model.

In operation the similar blocks may function similar to the monitoring and diagnostic system 164. For example, the data conditioning block 44 may receive raw process data from the process data source 60 and condition the process data to generate conditioned process data. Additionally, the feature extraction block 46 may analyze the conditioned process data to extract features, for example, by applying a transform based on feature extraction parameters. The feature selection block 48 may then select features from the extracted features based on feature selection parameters.

Based on the selected features, the modeling block 166 may then determine a process model that describes operation of the industrial automation process 12. In some embodiments, the modeling block 166 may receive conditioned process data and/or selected features to determine the process model. In this manner, the modeling block 166 may automatically determine the process model such that the process model describes relationship between a target variable (e.g., a controlled variable or expected output 18) and an automatically determined subset of conditioned process data and/or extracted/selected features.

Figure 15:
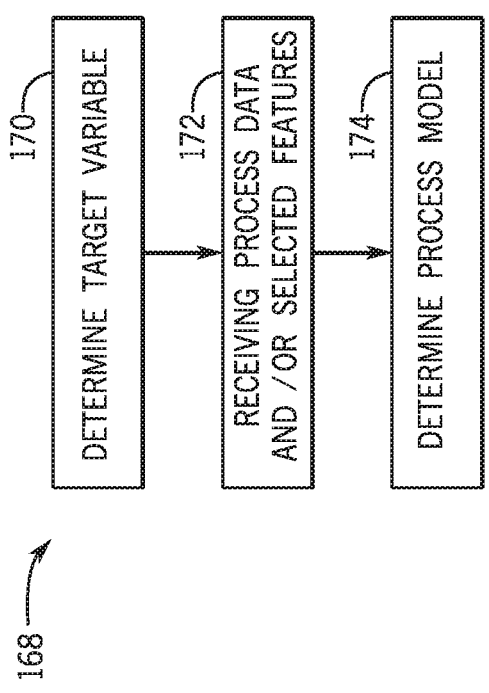
FIG. 15 is a flow diagram of a process for operating an automated modeling block of the modeling system of FIG. 14, in accordance with an embodiment.

To help illustrate, one embodiment of a process 168 describing operation of the modeling block 166 is described in FIG. 15. Generally, the process 168 includes determining a target variable (process block 170), receiving process data and/or selected features (process block 172), and determining a process model (process block 174). In some embodiments, the process 168 may be implemented using instructions stored in a tangible, non-transitory, computer-readable medium, such as memory 34 and/or memory 38, executable by processing circuitry, such as the processor 32 and/or processor 36.

Accordingly, in some embodiments, the control system 14 may use the modeling block 166 to determine a target variable (process block 170). In some embodiments, the target variable may be any suitable variable dependent on operation of the industrial automation process 12. For example, the target variable may be a controlled variable or output 18 of the industrial automation process 12. In some embodiments, the target variable to model may be predetermined or input to the control system 14 via the input devices 30. Additionally, value of the target variable may be directly measured (e.g., via a temporary sensor) or virtually measured (e.g., based on other measurements).

Additionally, the control system 14 may use the modeling block 166 to receive process data and/or selected features (process block 172). In some embodiments, the modeling block 166 may receive the selected features from the feature selection block 48. Additionally, the modeling block 166 may receive conditioned process data from the data conditioning block 44.

The control system 14 may then use the modeling block 166 to determine the process model (process block 174). In some embodiments, the modeling block 166 may analyze the conditioned process data and/or the selected features to determine a functional dependency with the target variable and/or parameters (e.g., coefficients) of the functional dependency. Additionally, in some embodiments, the modeling block 166 may analyze trend (e.g., current and past values) of the conditioned process data and/or the selected features to determine a functional dependency with trend of the target variable. Based on the functional dependency, the modeling block 166 may define the process model such that, during subsequent operation, the control system 14 may input process data and/or selected features to the process model to determine an expected current value of the target variable and/or an expected trajectory of the target variable over a control horizon. In this manner, the control system 14 may facilitate automatically determining a process model for the industrial automation process, thereby reducing reliance on user knowledge.

To further reduce reliance on user knowledge, the control system 14 may automatically adjust the process model. To facilitate, in the embodiment device in FIG. 14, the validation block 52 may determine an error between the expected value of the target variable and an actual value of the target variable. Thus, the validation block 52 may receive the expected value of the target variable from the modeling block 166. Based on the error, the modeling block 166 may adjust the process model. Since the process model is defined based at least in part on the selected features, the feature extraction block 46 may adjust feature extraction parameters used to determine the extracted features and the feature selection block 48 may adjust feature selection parameters used to select features from the extracted features based at least in part on the error. Thus, as depicted, the validation block 52 may feedback the error to the modeling block 166, the feature extraction block 46, and/or the feature selection block 48.

Accordingly, the technical effects of the present disclosure include improving performance monitoring, diagnostics, and/or modeling of an industrial automation system, for example, by reducing reliance on user knowledge. In some embodiments, a control system may extract features based on process data, for example, by applying a transform. Additionally, the control system may select a subset of the extracted features as selected features. The control system may then analyze the selected features to automatically determine an expected operational parameter, such as an expected operational state and/or expected value of a target value of the industrial automation system. In some embodiments, the control system may automatically adjust mapping used to determine the expected operational state and/or a process model based at least in part on subsequent operation of the industrial automation process. Based at least in part on the expected operational state the control system may also automatically determine and/or implement control actions to adjust operation of the industrial automation process.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An industrial automation system, comprising:
an automation device;
one or more sensors configured to measure one or more operational parameters of the industrial automation system; and
a control system communicatively coupled to the automation device and the one or more sensors, wherein the control system comprises:
a feature extraction block configured to determine extracted features by transforming process data determined based at least in part on the one or more operational parameters measured by the one or more sensors during operation of the industrial automation system based at least in part on feature extraction parameters;
a feature selection block configured to determine selected features by selecting a subset of the extracted features based at least in part on feature selection parameters, wherein the selected features are expected to be representative of the operation of the industrial automation system and the feature selection parameters are adjustable to facilitate increasing distance between operational state categories in a feature space;
a modeling block, configured to:
determine a target variable of the industrial automation system at a first time step;
determine functional dependency between the process data, the selected features, or both with the target variable;
automatically determine a process model that describes the operation of the industrial automation system based at least in part on the functional dependency; and
determine an expected value of the target variable at a second time step based at least in part on the process model; and
the control system is configured to control the operation of the industrial automation system by instructing the automation device to perform a control action based at least in part on the expected value of the target variable.

2. The industrial automation system of claim 1, wherein the feature extraction block is configured to transform the process data by performing a fast-Fourier transform analysis or a principle component analysis on the process data.

3. The industrial automation system of claim 1, wherein the target variable comprises a controlled variable or output of the industrial automation system.

4. The industrial automation system of claim 1, wherein the target variable comprises one or more values that correspond to one or more measurements received via the one or more sensors.

5. The industrial automation system of claim 1, wherein the target variable comprises one or more inputs into the control system.

6. The industrial automation system of claim 1, comprising a validation block configured to:
receive expected value from the modeling block;
determine an actual operational state of the industrial automation system;
determine an error between the expected value and the actual operational state; and
feedback the error to the feature extraction block, the feature selection block, the modeling block, or any combination thereof.

7. The industrial automation system of claim 6, wherein:
the feature extraction block is configured to automatically adjust the feature extraction parameters to reduce the error received from the validation block; and
the feature selection block is configured to automatically adjust the process model to reduce the error received from the validation block.

8. A method for operating an industrial automation system, comprising:
receiving, using a control system implemented in the industrial automation system, process data determined during operation of the industrial automation system from a process data source;
transforming, using the control system, the process data based at least in part on feature extraction parameters to determine extracted features;

selecting, using the control system, a subset of the extracted features based at least in part on feature selection parameters, wherein the subset of the extracted features are expected to be representative of the operation of the industrial automation system and the feature selection parameters are adjustable to facilitate increasing distance between operational state categories in a feature space;

determining, using the control system, a target variable of the industrial automation system, wherein the target variable comprises a controlled variable or an output of the industrial automation system;

determining, using the control system, a functional dependency between the target variable and the subset of the extracted features;

determining, using the control system, a process model that describes the operation of the industrial automation system based at least in part on the functional dependency;

determining, using the control system, an expected value of the target variable at a subsequent time step using the process model;

determining, using the control system, a control action to implement in the industrial automation system based at least in part on the expected value of the target variable; and transmitting, using the control system, a control signal to one or more industrial automation devices that instructs the one or more industrial automation devices to implement the control action.

9. The method of claim 8, wherein the functional dependency is determined based on a trend of the process data, a trend of the subset of the extracted features, or both.

10. The method of claim 8, comprising:
inputting the process data, the subset of the extracted features, or both into the process model to determine an additional expected value of the target variable over a control horizon;
determining an additional control action to implement in the industrial automation system based at least in part on the additional expected value of the target variable; and
transmitting the additional control action to the one or more industrial automation devices that instructs the one or more industrial automation devices to implement the additional control action.

11. The method of claim 8, comprising:
determining an error between an actual value of the target variable and the expected value of the target variable; and
adjusting the process model based on the error.

12. The method of claim 11, wherein the actual value of the target variable corresponds to sensor data acquired via one or more sensors.

13. The method of claim 8, comprising:
determining an error between an actual value of the target variable and the expected value of the target variable; and
adjusting the feature extraction parameters based on the error.

14. A method for operating an industrial automation system, comprising:
receiving, using a control system implemented in the industrial automation system, a plurality of process datasets that corresponds to a plurality of portions of the industrial automation system from a plurality of process data sources, wherein the plurality of process datasets is determined during operation of the industrial automation system;

transforming, using the control system, the plurality of process datasets based at least in part on feature extraction parameters to determine a respective plurality of extracted features;

selecting, using the control system, a respective plurality of subsets of the respective plurality of extracted features based at least in part on feature selection parameters, wherein the respective plurality of subsets is expected to be representative of the operation of the industrial automation system and the feature selection parameters are adjustable to facilitate increasing distance between operational state categories in a feature space;

determining, using the control system, a plurality of expected operational states of the plurality of portions of the industrial automation system by mapping the respective plurality of subsets of the respective plurality of extracted features into the feature space based at least in part on clustering parameters; and controlling, using the control system, the operation of the industrial automation system based at least in part on the plurality of expected operational states of the plurality of portions of the industrial automation system.

15. The method of claim 14, wherein controlling the operation of the industrial automation system comprises adjusting one or more operations of one or more components in a portion of the plurality of portions of the industrial automation system.

16. The method of claim 14, wherein controlling the operation of the industrial automation system comprises:
determining a target variable of the industrial automation system at a first time step;
determining a functional dependency between the plurality of process datasets, the respective plurality of subsets of the respective plurality of extracted features, or both with the target variable;
determining a process model that describes the operation of the industrial automation system based at least in part on the functional dependency;
determining an expected value of the target variable at a second time step based at least in part on the process model; and
sending one or more commands to one or more components in a portion of the plurality of portions of the industrial automation system, wherein the one or more commands are configured to adjust one or more operations of the one or more components.

\* \* \* \* \*